United States Patent
Lodwick et al.

(10) Patent No.: US 6,226,419 B1
(45) Date of Patent: May 1, 2001

(54) AUTOMATIC MARGIN ALIGNMENT USING A DIGITAL DOCUMENT PROCESSOR

(75) Inventors: Philip A. Lodwick, Richfield; Nicholas J. G. Hartzel, Jr., St. Paul, both of MN (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/258,386

(22) Filed: Feb. 26, 1999

(51) Int. Cl.[7] .......................................................... G06K 9/32
(52) U.S. Cl. ............................ 382/294; 358/406; 395/117
(58) Field of Search .................................... 382/294, 295, 382/287, 151; 400/74; 358/406; 702/94; 395/105, 117

(56) References Cited

U.S. PATENT DOCUMENTS

| 5,510,896 | 4/1996 | Wafler ................................. 358/296 |
| 5,642,202 | 6/1997 | Williams et al. ..................... 358/406 |
| 5,664,076 | 9/1997 | Pluta et al. .......................... 395/117 |
| 5,813,771 | 9/1998 | Ur et al. .............................. 400/74 |
| 5,864,774 | 1/1999 | Jones ................................... 702/94 |
| 6,016,207 | * 1/2000 | Wield ................................... 358/406 |

FOREIGN PATENT DOCUMENTS 0 449 403   10/1991   (EP) .

\* cited by examiner

Primary Examiner—Yon J. Couso
(74) Attorney, Agent, or Firm—Barry R. Lipsitz

(57) ABSTRACT

A system for automatic margin alignment for digital document processors. An output device is calibrated to graphics software without requiring the user to input offset information. The user need only print out first and second calibration sheets, overlay the first sheet on the second, and scan in the overlaid sheets. Margin marks such as vertical and horizontal lines on the first calibrating sheet signal the location of the respective horizontal and vertical margins. The edge of the first calibration sheet contrasts with the second calibration sheet to enable the scanner to detect the edge. Software calculates the required (x,y) offsets based on the number of scanning pixels between the edge of the first calibration sheet and the margin marks, and the resolution of the scanner. A rotational mis-calibration of the output device may also be calculated.

23 Claims, 9 Drawing Sheets

AUTOMATIC MARGIN ALIGNMENT USING A DIGITAL DOCUMENT PROCESSOR

BACKGROUND OF THE INVENTION

The present invention relates to a system for providing automatic margin alignment for digital document processors. The invention is particularly suitable for use with systems where a user creates a document using a high level language, such as a page description language, then rasterizes the image to provide raster image data, for example, for printing at a laser printer.

During document processing, computer generated images are rasterized and recorded on, e.g., laser printers, color or monochrome copiers, or used to expose frames of photographic film or the like.

To obtain the computer generated images, a user first generates a graphic image file using a computer graphics program, also referred to as a graphics application or a graphics layout program or software. The graphic image file may include one or more images or frames of image data which, for example, are in a bit mapped or text (e.g., ASCII) format. The image data are processed by a raster image processor (RIP), which provides frames of raster image data for use by an output device in generating images. Commonly available output devices include a graphic display monitor, film recorder, laser printer or copier.

Digital document processing systems have become increasingly popular since they allow a user to prepare relatively sophisticated, high quality documents, such as brochures, pamphlets, and the like. Moreover, such systems are relatively inexpensive and are therefore accessible for personal use or small business use.

Typically, the graphics layout software is run on a personal computer or a work station. The computer may be a stand alone unit or part of a network. The computer has an input device, such as a keyboard or a mouse, and a video display monitor that allows the user to preview an image before it is printed. The computer is typically interfaced to a printer for outputting data via a graphic image server, and to a scanner for receiving image data. The user assembles an image to be printed using a high level language such as a page description language wherein various graphical elements, e.g., logos, may be positioned in the image. The image elements may be positioned precisely within the image according to an on-screen measurement ruler or similar guide.

For example, it may be desired to insert a logo in the image at a specific distance from the top and sides of a page. Once the image is ready to be printed, it is provided to the graphic image server to be rasterized. The raster image data, which defines an image in terms of pixels, is then sent to the output device.

The graphic image server may comprise the EDOX™ system, for example, available from Management Graphics, Inc., Minneapolis, Minn., U.S.A., which includes a PC running Windows NT™. Documents are created using a graphics layout software package, such as PhotoShop™ or Quark Express™, running on a client PC or Macintosh™ computer, and sent to the EDOX system. The EDOX system takes data, such as PostScript™ data, generated by the graphics layout software, and creates a corresponding raster image, which is then sent to an output device. The graphics layout software allows the user to lay out graphics and text on a page so that they are printed in a specific location on the page. For example, it may be required for the text margins to be one inch from the left and right edges of the page, and for the company logo to appear centered on the page.

However, oftentimes the image that is viewed by the user using the graphic layout software on a computer monitor is not exactly the same as the printed image. For example, variations among printers of different manufacturers, such as the paper feed mechanism, as well as variations in printers by the same manufacturer can result in mis-calibrations (e.g., mis-alignment) of a printed image on a page, i.e., wherein the printed image does not appear in the desired position on the page.

Various solutions have been proposed to address this problem. For example, one approach requires the user to print a calibration page and to measure the mis-calibration using a ruler. Then, the user modifies the graphics layout software or graphic image server software by manually inputting the mis-calibration distances, e.g., as (x, y) coordinates. Another approach requires the user to print a duplexed (two sided) calibration page. The user then holds the page up to a light to determine a set of lines on each side which line up correctly. The user then manually inputs the appropriate information to the software. However, these approaches are generally unsatisfactory because they rely on the user to determine the degree of mis-calibration. The user may make a measurement error, may make an error in inputting the calibration information to the software, or may otherwise not follow the required instructions.

One proposed calibration solution calibrates a scanner, then calibrates a printer. A pre-printed, known test image that is printed based on pre-stored test image data in the computer. The printed image is then scanned in, and the computer compares the scanned-in image with the pre-stored image data using an image comparison algorithm to calibrate the system. The system essentially locates which pixels on the scanned-in image and the pre-stored image correspond to one another and provides an appropriate translation value, e.g., using a raster-to-raster transformation. Sufficient memory space is therefore required to store the two images.

Moreover, the need for sophisticated image comparison software raises the complexity and cost of the system. Also, it is inconvenient for the user to locate the pre-printed, known test image before a calibration can be performed since the pre-printed image is just a sheet of paper that can easily be misplaced. Additionally, mis-calibrations can still remain since the system calibrates a print out to pre-stored data, but does not calibrate the print out to the image viewed on a monitor by the user using the graphics layout software. That is, the image seen by the user is not calibrated-to the printed image since the calibration is not applied during rasterization of the image data from a graphics layout software. Moreover, the need to calibrate both the scanner and the printer introduces additional complexity.

Accordingly, it would be desirable to provide a method and apparatus for calibrating a printed or otherwise imaged document to an image in a document processing system. The system should provide calibration of the horizontal and vertical margins of a printed document. The system should be compatible for use with printers and other imaging devices made by different manufacturers.

Furthermore, the system should be relatively easy to implement by the user, and not require the input of any calibration data by the user. The system should not require calibration of a scanner. The system should be compatible with existing graphics layout software tool. The system should be implementable in a graphics image server during rasterization of image data.

The present invention provides a system having the above and other advantages.

SUMMARY OF THE INVENTION

The present invention relates to an automatic margin alignment system for documents.

A method for providing automatic margin alignment using a digital document processor includes the step of printing a first calibration sheet on an output device, such as a laser printer. The first calibration sheet has at least a first margin mark, such as a vertical or horizontal line, indicating a first margin location. A first edge region is located between the first margin mark and a first edge of the first calibration sheet. A second calibration sheet is provided having a first region (e.g., which is black) that contrasts with the first edge region (e.g., which is white).

The method includes the further steps of: positioning the first calibration sheet relative to the second calibration sheet for scanning such that at least a portion of the first region adjoins the first edge, and scanning along a line in the first region toward the first edge, through the first edge region, and up to the first margin mark to detect locations of the first edge and the first margin mark. An offset of the first margin mark relative to the first edge is then calculated according to the detected locations of the first edge and the first margin mark.

A rotational mis-calibration of the output device may optionally be calculated based on the offset.

The calculated offset is provided to the digital document processor to calibrate data (e.g., subsequent print jobs) provided to the output device. For example, the calibration may be applied at the digital document (e.g., graphic image server) when the image is rasterized prior to printing.

The first calibration sheet may have a second margin mark indicating a second margin location. This allows calculation of an offset of the second margin mark relative to a second edge of the first calibration sheets in a manner analogous to the calculation of the offset of the first margin mark.

The first margin mark may indicate a margin of the first calibration sheet that is perpendicular to a margin indicated by the second margin mark, e.g., as with horizontal and vertical margins.

The method may include the further step of counting a number of scanning pixels between the first margin mark and the first edge, wherein the offset of the first margin mark relative to the first edge is calculated according to the number of scanning pixels and a scanning pixel resolution (e.g., dots per inch).

Corresponding alignment marks may be provided on the first and second calibration sheets to assist a user in positioning the sheets for scanning.

A corresponding apparatus is also presented.

Corresponding first and second calibration sheets are also presented.

DETAILED DESCRIPTION OF THE INVENTION

The present invention relates to an automatic margin alignment system for a digital document processor in accordance with the present invention.

Figure 1:
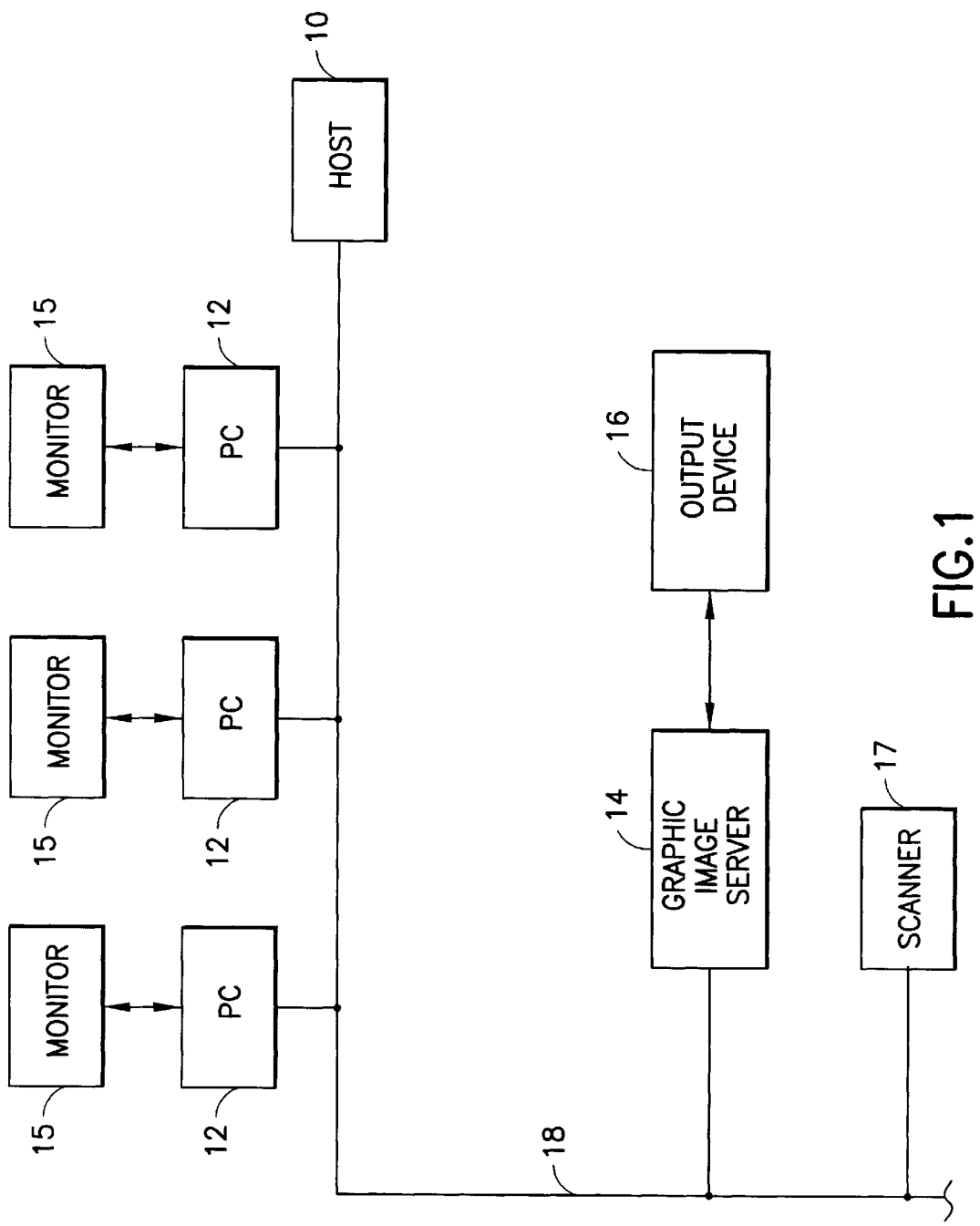
FIG. 1 is a diagrammatic illustration of a network including a host computer, a plurality of workstations, an output controller, and output devices for use with the present invention.

FIG. 1 illustrates a computer network for use with the present invention. The network includes a host computer 10 and a plurality of personal computers (e.g., PC or Macintosh) and/or workstations 12, each of which may communicate with the host computer 10 and with a graphic image server 14 via network path 18. Each computer 12 may have a monitor 15. One or more output devices, such as a laser printer 16, are coupled to graphic image server 14 for the generation of documents. A digital document processing system is implemented in the graphic image server 14. The term "document" is used herein to refer to paper, photosensitive substrates such as transparencies, slides or the like.

A user creates a graphic image file that includes one or more graphic images, using a personal computer or workstation 12 that runs commercially available graphics layout software. The graphic image file, e.g., having a text or bitmap format, may then be communicated to the graphic image server 14 via network path 18. It will be appreciated that the graphic image files may, rather than being transferred along network 18, be temporarily stored on a medium such as a diskette and then input to the graphic image server 14 via a floppy disk drive or the like. After receiving the graphic image file, the graphic image server 14 processes the data for each of the individual images contained in the file into raster image data for transfer to the output device 16. The processing by the graphic image server 14 is considered to be digital document processing. The output device 16 then scans the raster image data onto an output medium such as paper or photographic film.

The graphic image files created by different users may be in any of several conventional formats, e.g., such as PostScript™ files, TIFF™ files and Targa™ files. PostScript, for example, is a device-independent page description language optimized to render document images on display devices, laser printers, film recorders, fax machines and phototypesetters. PostScript data is interpreted by an associated interpreter (e.g., such as the EDOX system implemented in the graphic image server 14) to create a bit map.

For some printers, the bitmap may represent a pixel with one bit of data. When an actual page is printed, each pixel corresponding to a "1" bit may be printed in black (or a predefined color) while each pixel corresponding to a "0" bit is left blank. PostScript is typically used for line art, with or without photographic images. TIFF files comprise a tagged image file format bitmap. Targa files are also bit mapped files.

For some color printers, the bitmap may represent a pixel with thirty-two bits of data, e.g., eight bits each for cyan, magenta, yellow and black, with the printer making one pass for each color. An RGB color printer may use twenty-four bits per pixel.

A scanner 17 also communicates with the network of FIG. 1. The scanner 17 may have a glass platen upon which a document can be placed for scanning. Advantageously, the scanner 17 need not be calibrated, except for a scale factor. The corresponding data can then be provided to other devices in the network, such as the graphic image server 14.

While FIG. 1 depicts a network with a plurality of PCs and workstations, the invention is suitable as well for a single PC or workstation.

Figure 2:
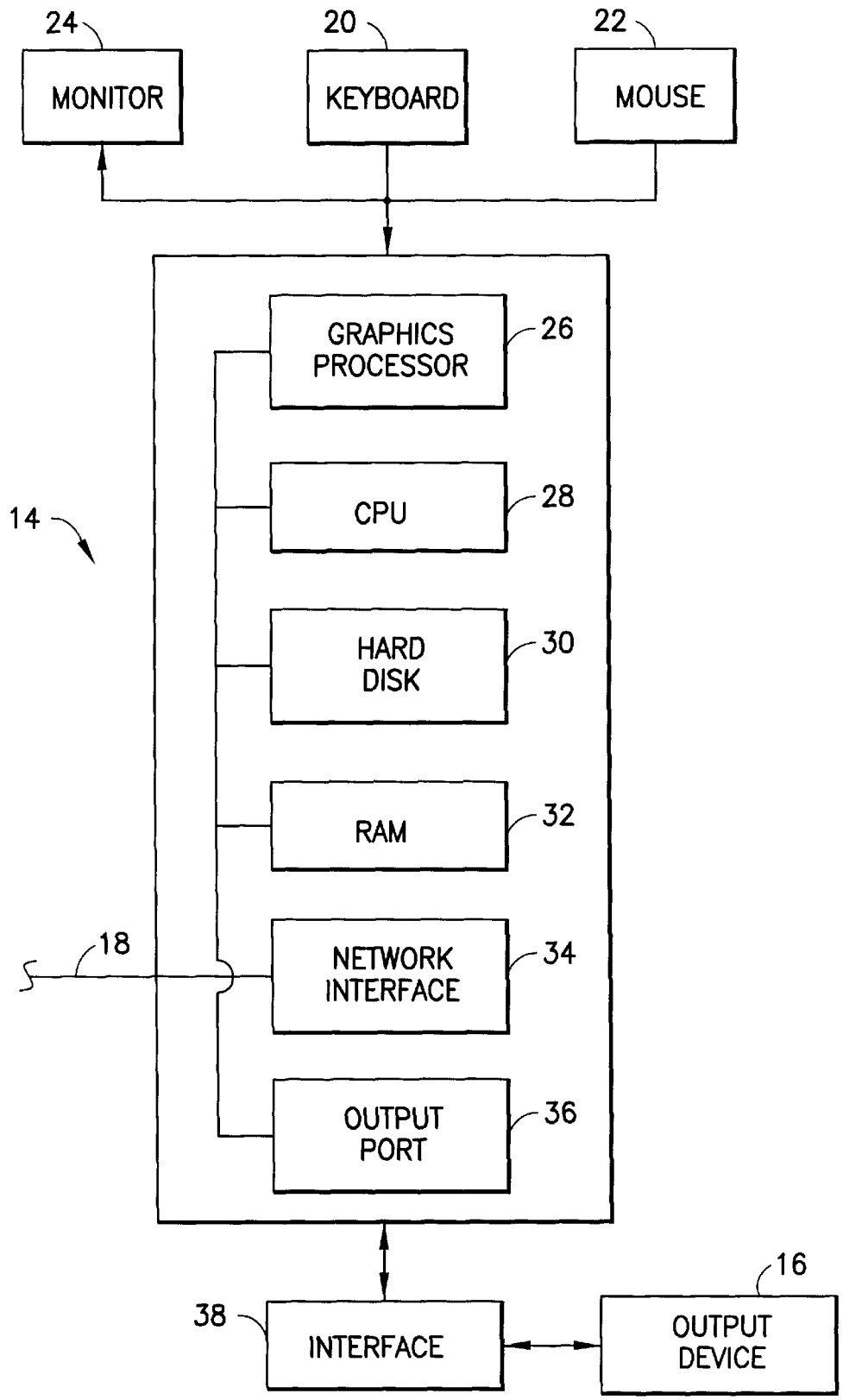
FIG. 2 is a block diagram of a workstation embodying a graphic image server for use with the present invention.

FIG. 2 depicts the hardware components of a graphic image server 14 for use with the present invention. The image server 14 can be implemented in a graphics workstation. User interfaces include a keyboard 20 and a mouse 22, for example. A graphic display monitor 24 is also provided as a user interface and can be configured as a separate output device for viewing rasterized images generated by the graphic image server. The printed document is calibrated to the image seen by the user on the monitor 15 associated with the graphics layout software. The monitor 24 is only an optional device for viewing the image after rasterizing.

Graphics capability is provided in the graphic image server 14 by a graphics processor 26.

One or more central processing unit(s) (CPU) 28 provides intelligence for the graphic image server 14. Software, including raster image processor software (e.g., PostScript, TIFF and Targa) and automatic document calibration software in accordance with the present invention is stored, e.g., on a hard disk 30 or can be transferred from host computer 10. Random access memory (RAM) 32 is provided for use by the graphic image server 14 and may be used for various queues. A network interface 34, such as an Ethernet interface, allows the graphic image server 14 to communicate with other components coupled to network path 18. Output port 36, which can be, for example, a standard Centronics(tm) parallel port, couples the workstation to output device 16 (e.g., an image recorder, laser printer, or the like) via a conventional interface 38 such as a universal asynchronous receiver transmitter (UART) port, or an external small computer standard interface (SCSI).

Figure 3:
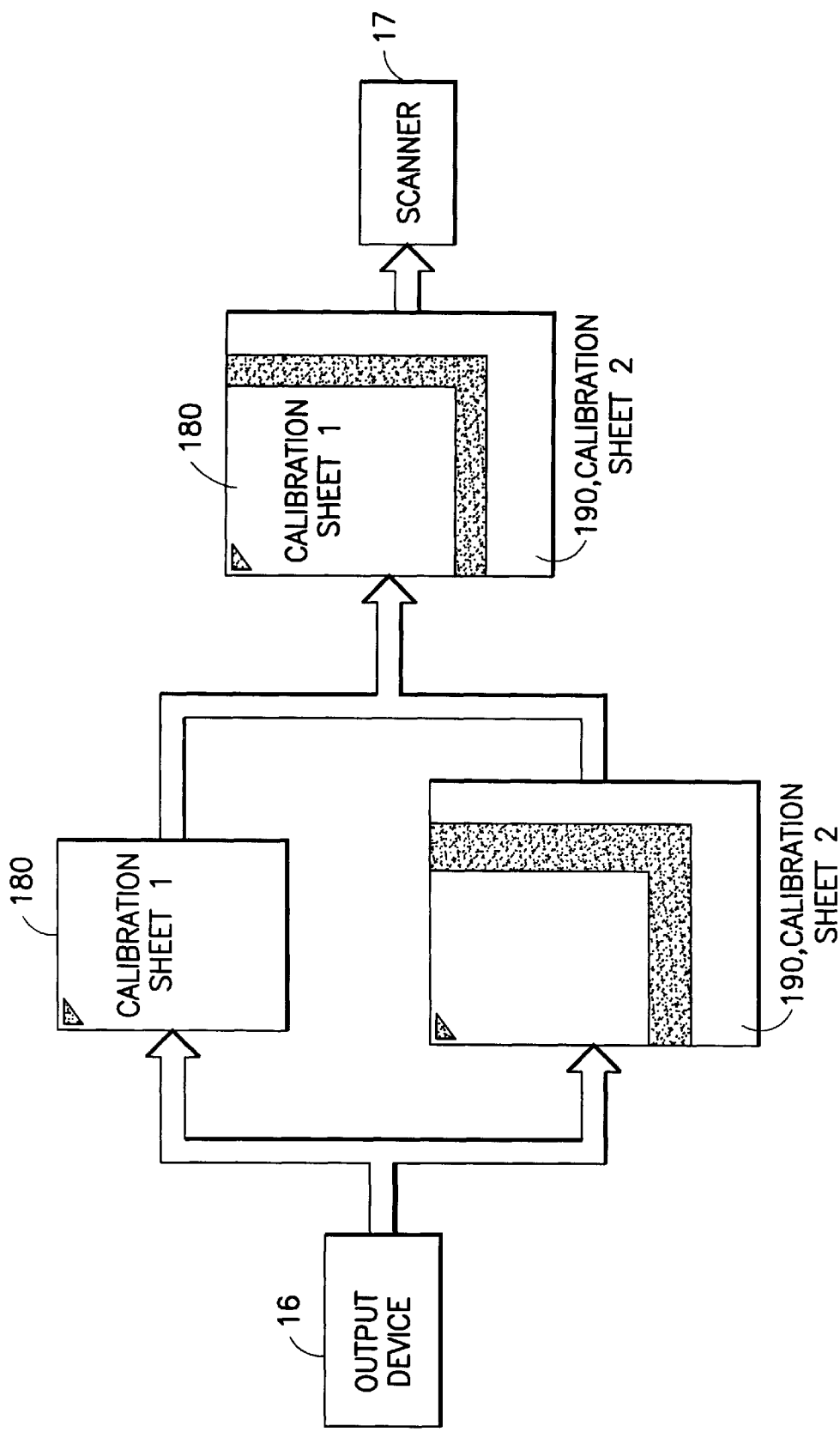
FIG. 3 illustrates an automatic margin alignment process in accordance with the present invention.

FIG. 3 illustrates an automatic margin alignment process in accordance with the present invention. The output device 16 is used to print first and second calibration sheets 180, 190, respectively. The first sheet 180 is overlaid on the second sheet 190 and the combination is provided to the scanner 17 to be scanned. Data from the scanner 17 corresponding to the scanned-in calibration sheets is then provided for use, e.g., by the graphic image server 14 in FIG. 2 for processing in accordance with the present invention to determine a vertical and/or horizontal mis-calibration of the printer 16 with respect to the image provided on the display 15 used with the graphics layout software.

Figure 4:
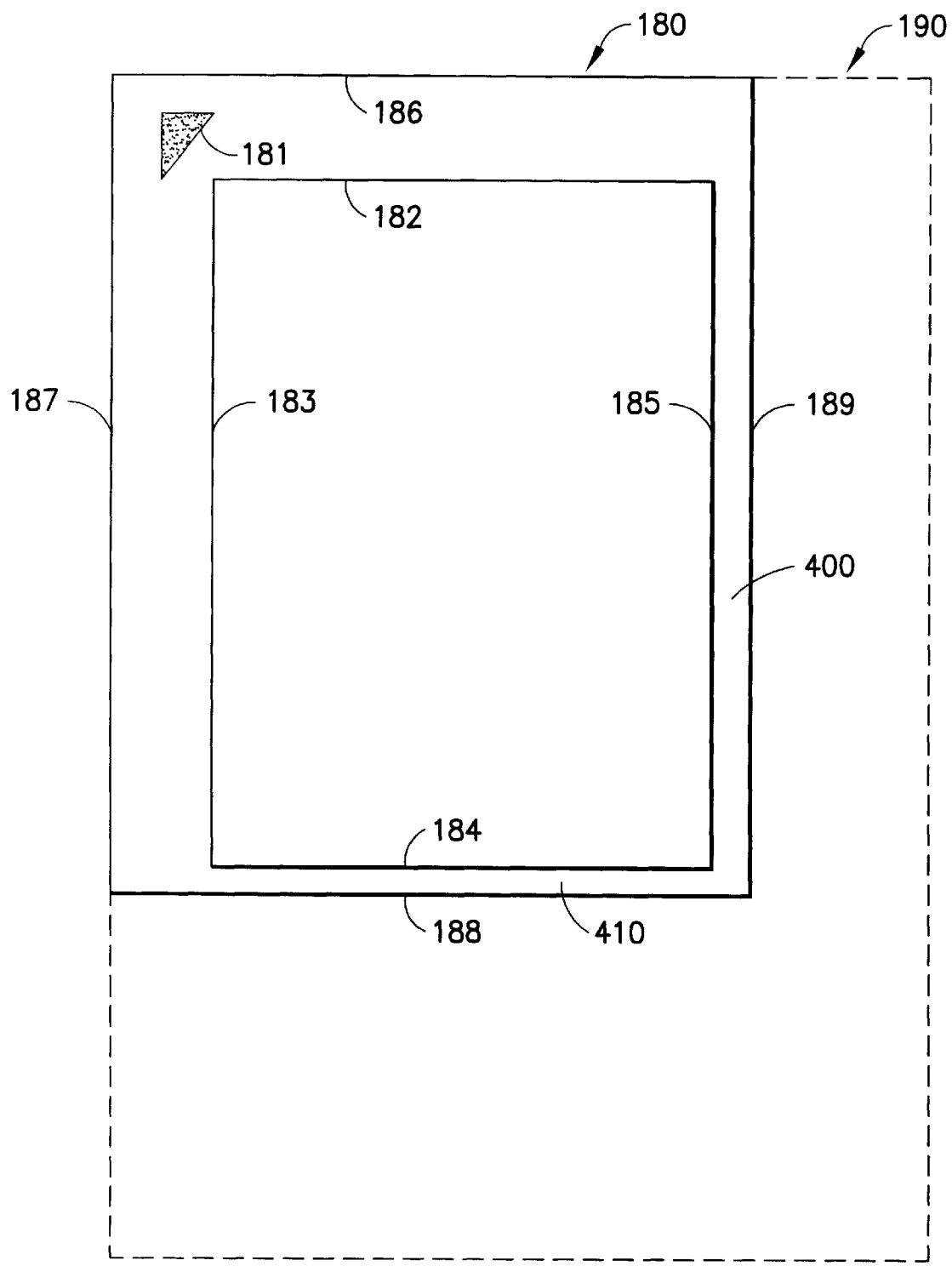
FIG. 4 illustrates a first, mis-aligned calibration sheet in accordance with the present invention.

FIG. 4 illustrates a first, mis-aligned calibration sheet in accordance with the present invention. The first calibration sheet 180 is shown with the second calibration sheet 190 in phantom. The first calibration sheet 180 may have a width of 8½ inches and a height of eleven inches, for example, while the second calibration sheet 190 may have a width of eleven inches and a height of seventeen inches, for example. These are common document sizes that are readily available in the United States. However, the invention is suitable for use with essentially any document size, including other readily available sizes, such as A4. Generally, the second calibration sheet 190 should be larger than the first calibration sheet 180.

Only the first calibration sheet 180 must be printed out on the output device to be calibrated. The second calibration sheet can be provided as a pre-printed form, or printed on any other printer. That is, the relative position of the first and second calibration sheets need not be exact as long as a contrast is provided at the transition between the two sheets at an edge of the first sheet.

The first calibration sheet 180 includes a top edge 186, a bottom edge 188, a left edge 187 and a right edge 189. Additionally, in an example embodiment, it is assumed that the graphics and text are to be printed within the bounds of a top margin mark (e.g., line) 182, a bottom margin mark (e.g., line) 184, a left margin mark (e.g., line) 183 and right margin mark (e.g., line) 185. It is further assumed that the margins are to be evenly spaced from the respective edges of the first calibration sheet 180. For example, the distance between the top edge 186 and the top margin mark 182 is to be one inch, along with the distances between the bottom margin mark 184 and the bottom edge 188, the left edge 187 and left margin mark 183, and the right margin mark 185 and right edge 189. As can be seen, the first calibration sheet 180 reveals that the margin marks 182–185 are shifted too far to the right and too far down on the sheet 180.

The assumptions made here regarding the margins are for purposes of illustration only. The margins can be provided in essentially any location. Moreover, the margins need not be evenly spaced from the respective edges of the first calibration sheet 180

An edge region 400 is located between the margin mark 185 and the right-hand edge 189, while an edge region 410 is located between the margin mark 184 and the bottom edge 188.

The first calibration sheet 180 also includes an alignment mark 181.

Information necessary to print the first calibration sheet 180 is provided in the graphics layout software used by the user on the PC 12. Provision of the information necessary for providing the first calibration sheet is believed to be within the purview of those skilled in the art and therefore will not be described in greater detail.

Figure 5:
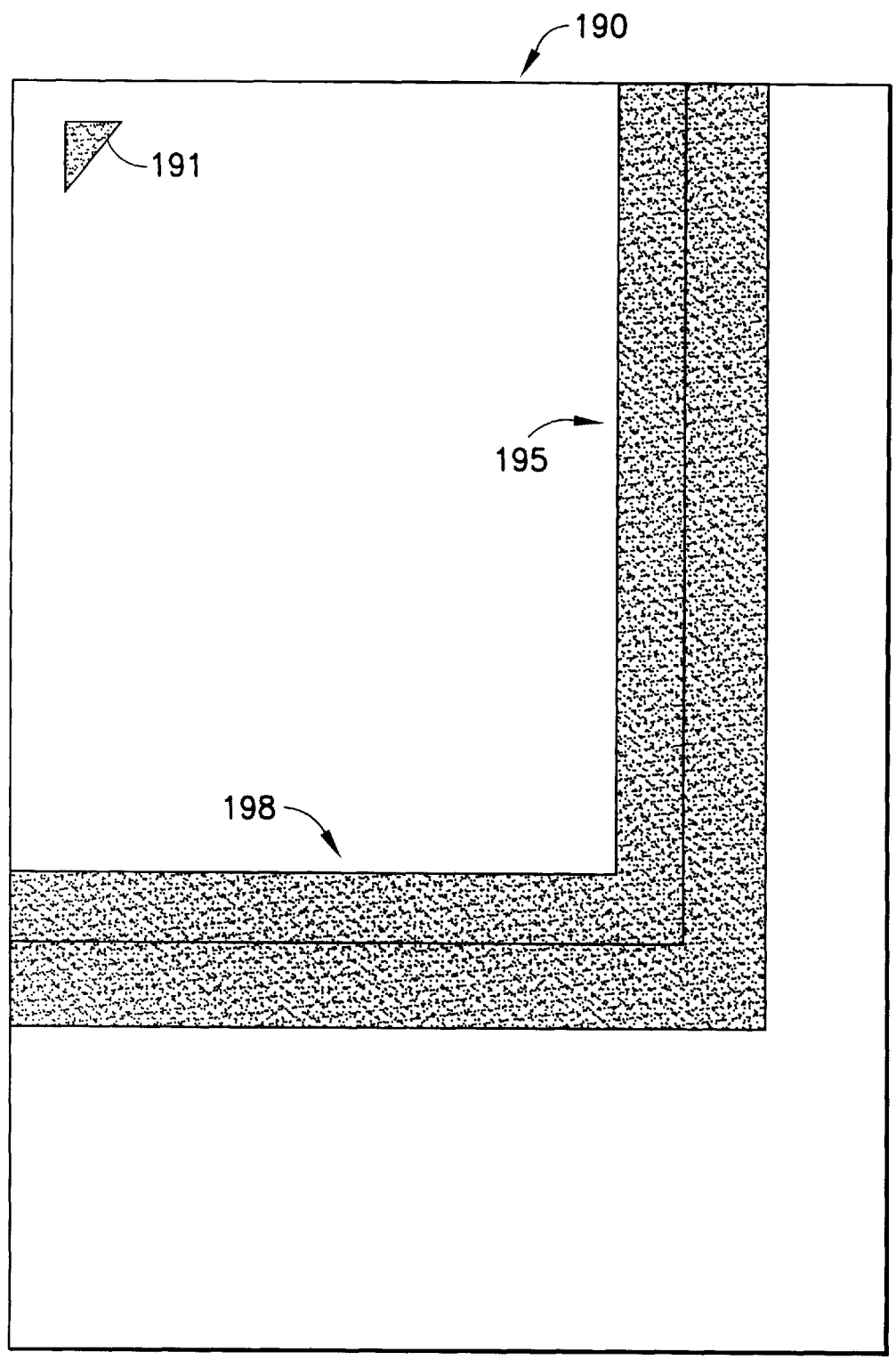
FIG. 5 illustrates a second calibration sheet in accordance with the present invention.

FIG. 5 illustrates a second calibration sheet in accordance with the present invention. The second calibration sheet 190 includes an alignment mark 191 and contrasting (e.g., shaded) regions 195, 198. Preferably; the shaded region 195, 198 are black or otherwise contrasting with the edge regions first calibration sheet 180. For example, if the first calibration sheet 180 has a dark background with light margin marks (e.g., lines) 182–185, the region 195, 198 should be light.

Furthermore, while the second calibration sheet 190 may form an entire sheet as shown, this is not required. For example, it is possible to provide two dark strips, joined to one another in an L-shape, or simply placed next to one another, to form the contrasting regions 195, 198. If calibration of only one margin (e.g., horizontal or vertical) is desired, only one dark strip need be provided. Additionally, it will be appreciated that regions 195, 198 need not extend along the entire length of the respective edges of the second calibration sheet 190. The regions need only extend based on the regions to be scanned, as discussed in connection with FIG. 6. The phrase "second calibration sheet" is meant to encompass these variations.

Figure 6:
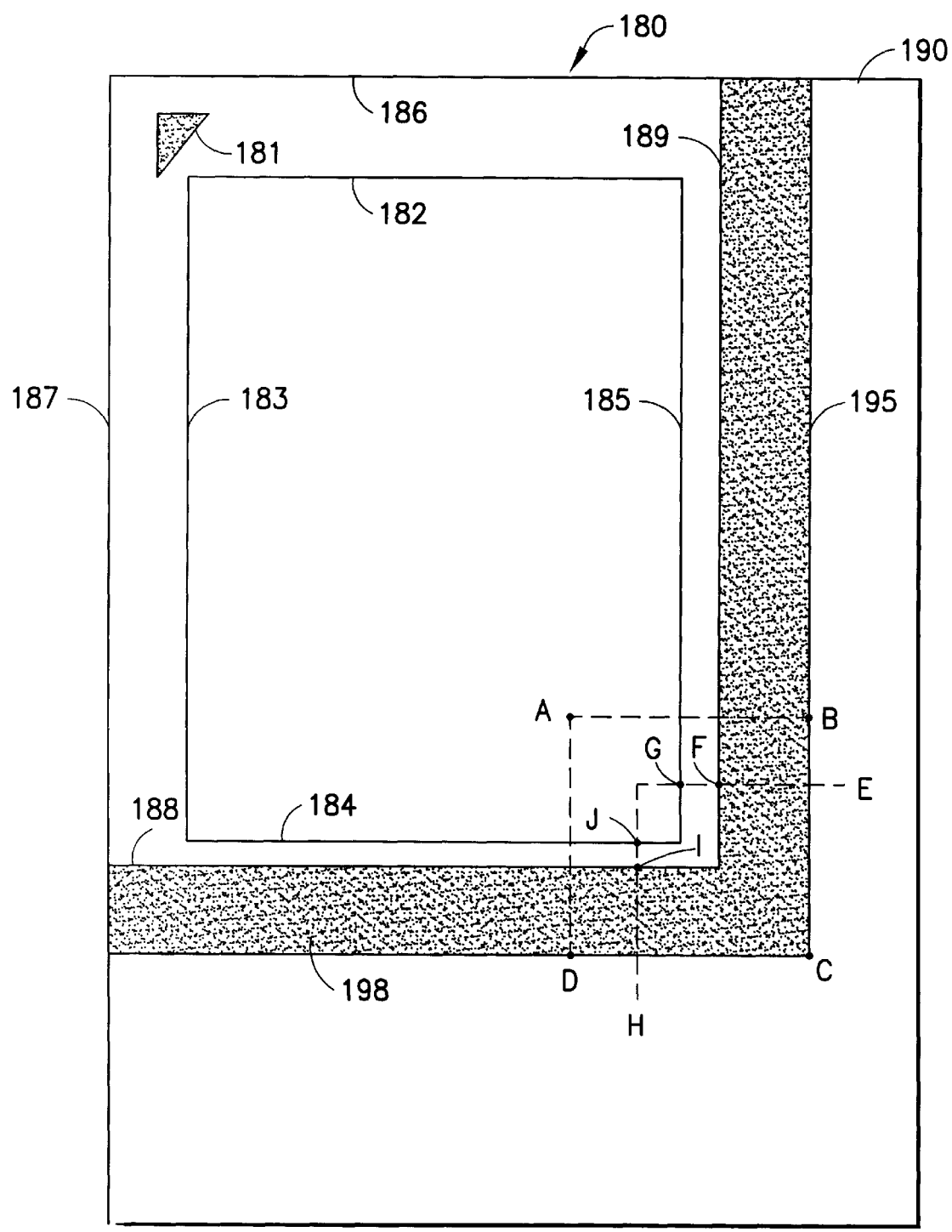
FIG. 6 illustrates an overlay of the first calibration sheet on the second calibration sheet for scanning in accordance with the present invention.

FIG. 6 illustrates an overlay of the first calibration sheet on the second calibration sheet for scanning in accordance with the present invention. Once the first and second calibration sheets 180, 190 are printed by the user on the printer which is to be calibrated, the first calibration sheet 180 may be overlaid on the second calibration sheet 190, e.g., in the upper left-hand portion of the second calibration sheet 190. The alignment mark 181 of the first sheet 180 may be overlaid on the alignment mark 191 of the second sheet 190. The alignment marks 181, 191, which are optional, assist the user in positioning the first and second calibration sheets for scanning.

The calibration sheets 180, 190 are then placed by the user onto the platen of a scanner, and a portion of the sheets is scanned. If contrasting strips for the regions 195, 198 are used instead of a rectangular second calibration sheet, e.g., as shown in FIG. 5, the strips can be placed directly next to, or partially overlaying, the edges 188, 189 of the first calibration sheet 180.

Using software techniques which should be apparent to those skilled in the art, an area ABCD is scanned by the scanner 17. On an imaginary line E, the scanning may start at the right edge of the shaded region 195 of the second calibration sheet 190, and proceed to point F, which is at the right-hand edge 189 of the first calibration sheet 180. Point F essentially represents the first pixel of the first calibration sheet 180. Appropriate processing may be employed to avoid false indications of the first pixel, e.g., such as may be caused due to dust.

The region 195 need only extend in a region of the line E to provide a contrast with the edge 189 during scanning.

The scanning continues along line E until point G is reached at the margin mark (e.g., vertical line) 185 representing the right-hand margin of the first calibration sheet 180. While a vertical line 185 is shown here to signal the presence of a margin, a contrasting square or other shape can be used.

In accordance with the present invention, the number of pixels detected by the scanner between point F and point G is counted, and used along with the resolution of the scanner (e.g., dots-per-inches) to determine the linear distance between points F and G.

For example, if 150 dots are counted between points F and G, and the resolution of the scanner is 300 dots per inch, the distance between points F and G can be calculated as ½ inch. The processing software (e.g., at the graphic image server 14) should be provided with the resolution of the scanner. However, this information can be easily entered by the user by selecting the scanner type, e.g., manufacturer and model number. In many cases, the scanner's resolution is already known by the graphics processing software so no action by the user is required in this regard.

Furthermore, since the distance between the right-hand margin mark 185 and the right edge 189 of the first calibration sheet 180 is desired to be a specific distance, e.g., one inch, an error between the desired distance and the measured distance can be determined. The processing software can then provide the necessary adjustments automatically, without requiring any further input from the user.

To determine a vertical offset error, scanning may proceed along an imaginary line H until the first white pixel at point I is detected. Then, the number of pixels between point I at the bottom edge 188 and point J at the margin mark (e.g., horizontal line) 184 representing the bottom margin can be determined. The processing software may then calculate a vertical adjustment based on the distance between the desired distance between points I and J and the measured distance, e.g., using a vector-to-raster transformation.

The region 198 need only extend in a region of the line H to provide a contrast with the edge 189 during scanning.

In FIG. 4, offsets were determined for the horizontal and vertical directions. However, in accordance with the present invention, only one offset value need be determined. Moreover, the offset value may be determined in relation to any offset orientation, e.g., not just horizontal or vertical. For example, an offset extending diagonally may be determined by providing a shaded diagonal region on the second calibration sheet 190. Generally, the offset is determined in a direction that is perpendicular to an edge of the first calibration sheet 180.

Moreover, the first calibration sheet 180 need not have four margin marks 182–185. Only one margin mark is required for each offset direction to be calibrated. For example, to calibrate the sheet 180 horizontally, only margin mark 183 or 185 is required. To calibrate the sheet 180 vertically, only mark 182 or 184 is required. Generally, with the overlay position of the calibration sheets as shown in FIG. 6, margin marks 184 and 185 would be used since the top edge 186 and left edge 187 of the first calibration sheet 180 is assumed to be at the boundary of the scanning field. The regions 195, 198 must be within the scanning field of the scanner, at least in part.

Furthermore, it is possible to provide more than one margin mark for calibrating a given margin. For example, for a one inch margin, marks may be provided at ½ inch and at one inch from the an edge of the first calibration sheet 180. Optionally, the margin marks may differ, e.g., in width. This may provide a more positive margin detection determination by the scanner. Moreover, the position of the margin may be calculated independently based on each margin mark, and the results averaged or otherwise processed to determine the location of the desired margin.

Also, if a scanner has the capability to scan in a diagonal direction with respect to the nominal horizontal and vertical boundaries of the calibration sheet, the position of a margin can be determined by accounting for the horizontal and vertical movement during the diagonal scan.

Figure 7:
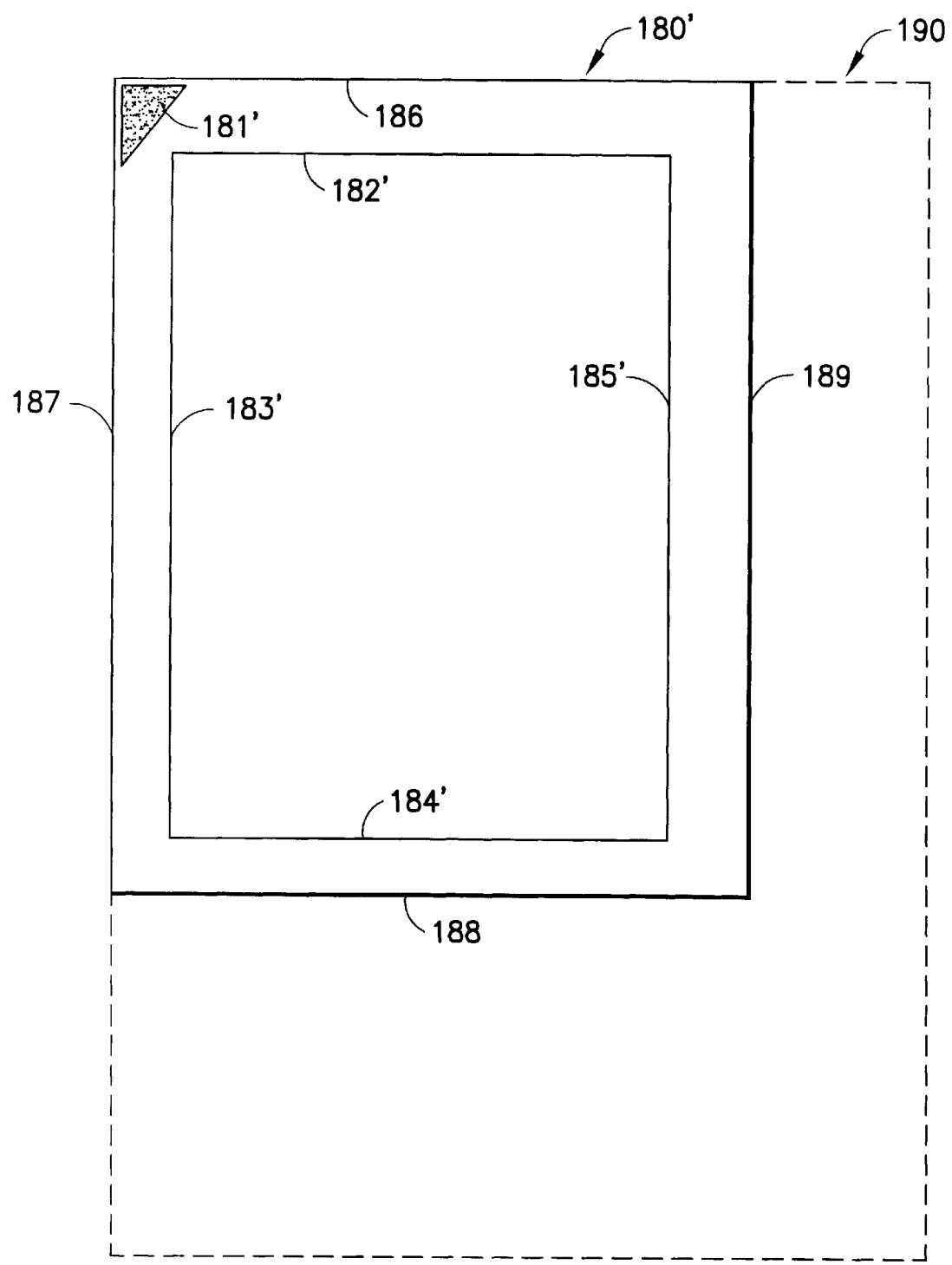
FIG. 7 illustrates a first, aligned calibration sheet in accordance with the present invention.

FIG. 7 illustrates a first, aligned calibration sheet in accordance with the present invention. After the image of FIG. 6 has been scanned in and the appropriate margin calibration offsets determined and applied, the documents which are subsequently processed (e.g., rasterized) and printed will be aligned with the image which appears on the user's monitor 15. For example, if the user reprints the first calibration sheet 180', the margins 182', 183', 184' and 185' would appear in the printed document with the desired spacings from the respective edges 186, 187, 188 and 189 of the calibration sheet 180'.

For example, compare the first calibration sheet 180 of FIG. 4 to the calibration sheet 180' of FIG. 7. The position of the alignment mark 181' has also moved.

The alignment mark 181' is an optional device to assist the user in overlaying the first calibration sheet 180 on the second calibration sheet 190 on the scanner, and may have any desired shape. Additionally, more than one alignment mark may be provided. Moreover, any other known alignment mechanism may be used to ensure that the first calibration sheet 180 is overlaid properly on the second calibration sheet 190 during the scanning. Generally, the edges of the respective calibration sheets are positioned flush with edges of the platen of the scanner 17.

Figure 8:
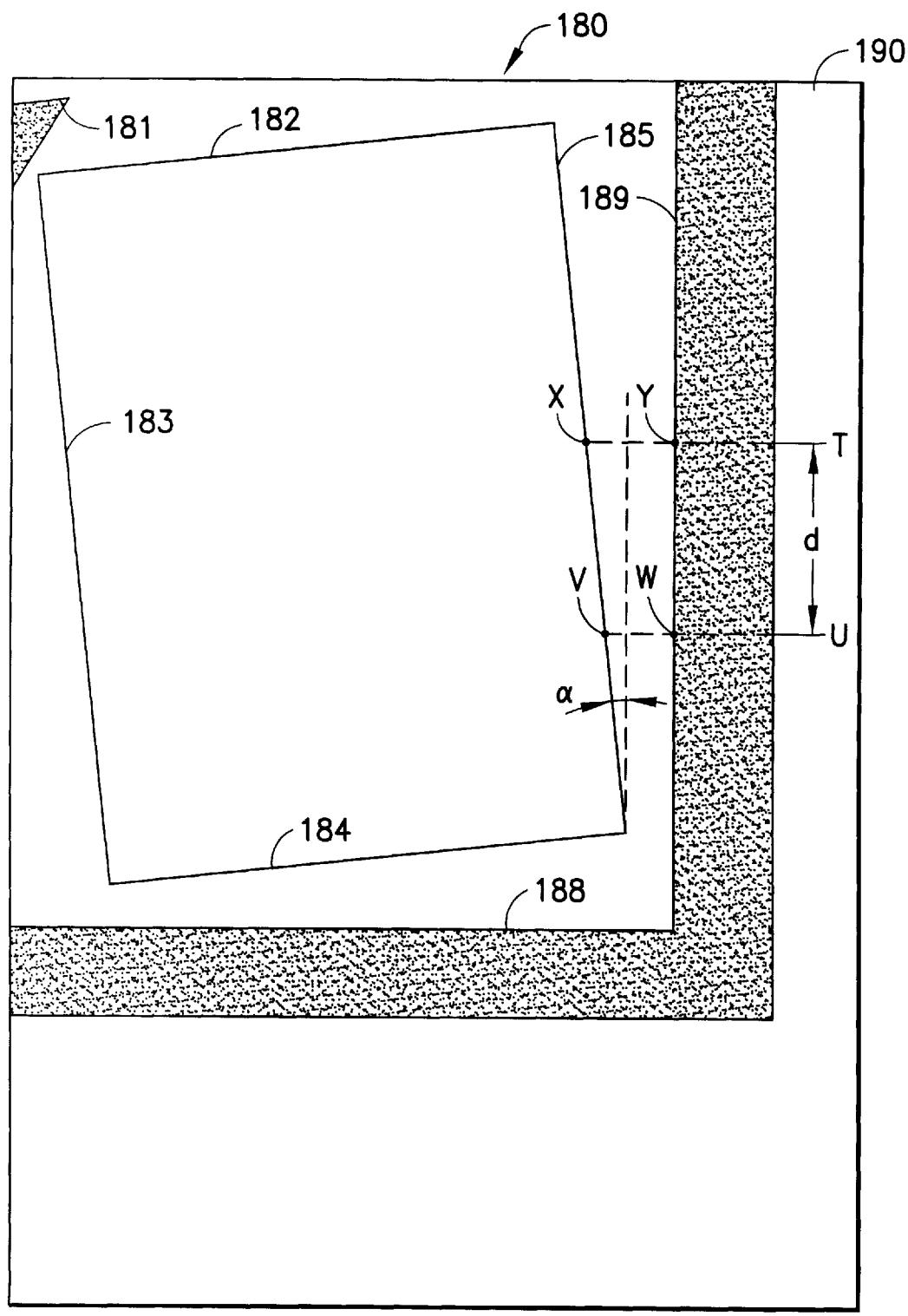
FIG. 8 illustrates an overlay of the first calibration sheet on the second calibration sheet for scanning to determine a rotational mis-calibration in accordance with the present invention.

FIG. 8 illustrates an overlay of the first calibration sheet on the second calibration sheet for scanning to determine a rotational mis-calibration in accordance with the present invention. Here, the margins 182–185 and the alignment mark 181 are rotated by an angle α with respect to the first calibration sheet 180. The degree of misalignment is shown rather exaggerated relative to what is typically expected.

The rotation angle α can be determined by scanning along line U and determining a distance WV between point W and point V, then scanning along line T and determining a distance XY between point X and point Y. Lines T and U are separated by a distance d. The scanner may have the capability to automatically locate line T relative to line U. If not, additional marks can be provided on the first and/or second calibration sheets to inform the scanner of the desired scan locations.

The rotation angle α (e.g., rotational mis-calibration) can be calculated by inverting the equation: $\tan(\alpha) = (XY - VW)/d$. Corresponding data is then provided, e.g., to the graphic image server 14 to calibrate subsequent output images.

Figure 9:
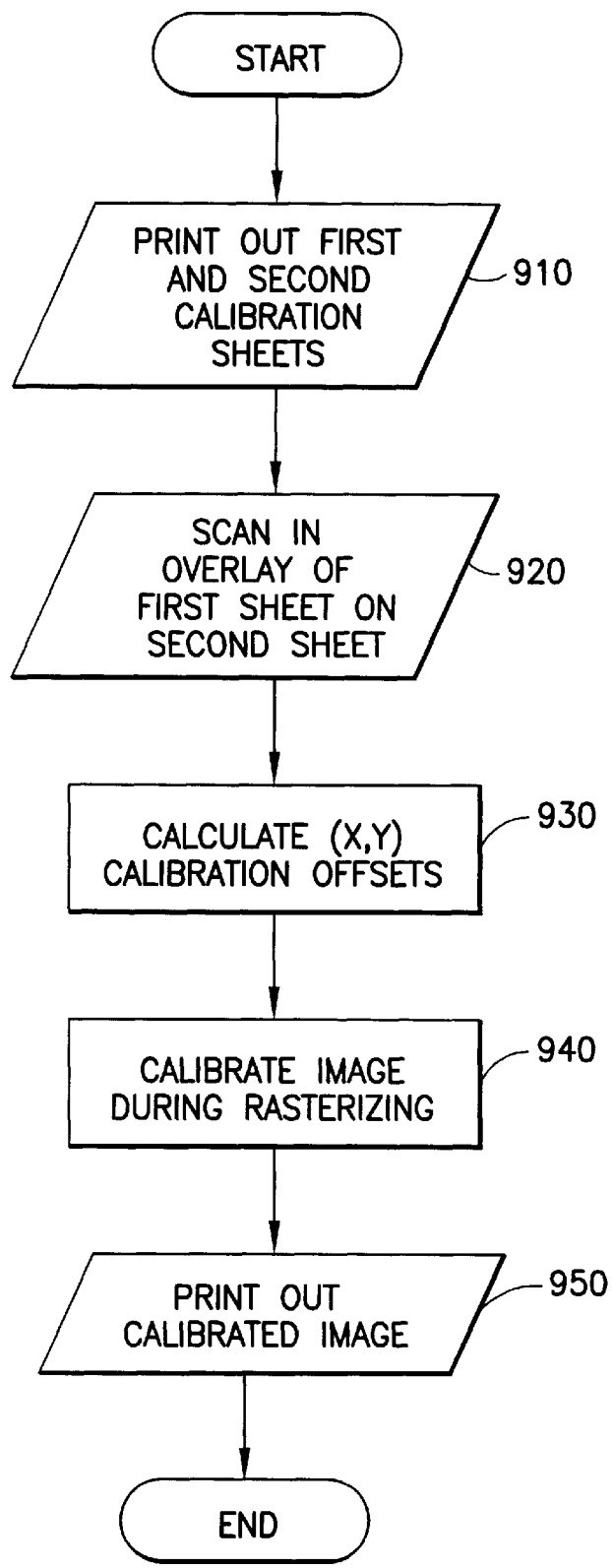
FIG. 9 illustrates a calibration method in accordance with the present invention.

FIG. 9 illustrates a calibration method in accordance with the present invention. At block 910, the first and second calibration sheets are printed out on the output device which is to be calibrated. As mentioned, only the first calibration sheet must be printed out on the output device to be calibrated. The second calibration sheet can be provided as a pre-printed form, or printed on any printer. Moreover, the alignment marks 181, 191 need not be aligned with one another if the first calibration sheet and second calibration sheet are not printed on the same printer. In the example calibration sheets shown, it is only necessary for the top and left edges of the first calibration sheet to be aligned on the scanner, and for the shaded regions 195, 198 to be adjacent to the respective edges 189, 188 of the first calibration sheet 180 in a region of the scanning lines E and H (FIG. 6).

At block 920, the overlay of the first calibration sheet on the second calibration sheet is scanned in as discussed in connection with FIG. 6. At block 930, horizontal (x) and vertical (y) calibration offsets are calculated based on the respective errors of the positions of the vertical and horizontal margin lines 185, 184 of the first calibration sheet 180. At block 940, once the calibration offsets have been determined, the image which is to be printed is calibrated, e.g., during rasterizing. At block 950, the calibrated image is printed out.

As can be seen, the present invention provides a method and apparatus for automatic margin alignment using a digital document processor. The digital document processor calibrates and rasterizes data received from a PC running a graphics layout software. The rasterized and calibrated data, e.g., bitmap data, is then printed. Advantageously, an output device is calibrated to the graphics layout software without requiring the user to input offset information. The user need only print out first and second calibration sheets, overlay the first sheet on the second, and scan in the overlaid sheets. Margin marks, such as vertical and horizontal lines on the first calibrating sheet, signal the location of the respective horizontal and vertical margins.

The invention may be extended to measure and adjust for rotation and scaling parameters.

Moreover, while the calibration of a single output device has been discussed, it should be appreciated that any number of output devices may be calibrated by printing the respective first calibration sheets on each device. The appropriate calibrations can be automatically applied to the output device selected for printing. Additionally, each paper tray in a printer can be calibrated.

Moreover, it is possible to print a duplex print with calibration marks on each side, e.g., for calibrating a duplex tray of a printer. In this case, each side of the printed calibration sheet is overlaid on the second calibration sheet and scanned in to obtain the corresponding calibration data.

Although the invention has been described in connection with various specific embodiments, those skilled in the art will appreciate that numerous adaptations and modifications may be made thereto without departing from the spirit and scope of the invention as set forth in the claims.

For example, while the software for implementing the calibrations may be located in the graphic image server 14, it may alternatively, or additionally, be located elsewhere, such as in the host computer 10 or PC 12.

What is claimed is:

1. A method for providing automatic margin alignment using a digital document processor, comprising the steps of:

printing a first calibration sheet on an output device;

said first calibration sheet having at least a first margin mark indicating a first margin location, a first edge, and a first edge region located between said first margin mark and said first edge;

providing a second calibration sheet having a first region that contrasts with said first edge region;

positioning said first calibration sheet relative to said second calibration sheet for scanning such that at least a portion of the first region adjoins said first edge;

scanning along said portion toward said first edge, through said first edge region, and up to said first margin mark to detect locations of said first edge and said first margin mark; and calculating an offset of said first margin mark relative to said first edge according to the detected locations of said first edge and said first margin mark.

2. The method of claim 1, comprising the further step of:

providing the calculated offset to the digital document processor to calibrate data provided to the output device.

3. The method of claim 2, wherein:

the calibration occurs during rasterization of the data.

4. The method of claim 1, wherein:

said first calibration sheet further has a second margin mark indicating a second margin location, a second edge, and a second edge region located between said second margin mark and said second edge; and said second calibration sheet has a second region that contrasts with said second edge region;

comprising the further steps of:

positioning said first calibration sheet relative to said second calibration sheet for scanning such that at least a portion of the second region adjoins said second edge;

scanning along the second region toward said second edge, through said second edge region, and up to said second margin mark to detect locations of said second edge and said second margin mark; and calculating an offset of said second margin mark relative to said second edge according to the detected locations of said second edge and said second margin mark.

5. The method of claim 4, wherein:

said first margin mark indicates a margin of said first calibration sheet that is perpendicular to a margin indicated by said second margin mark.

6. The method of claim 1, comprising the further step of:

counting a number of scanning pixels between said first margin mark and said first edge; wherein:

said calculating step calculates said offset according to the number of scanning pixels and a scanning pixel resolution.

7. The method of claim 1, comprising the further step of:
providing corresponding alignment marks on said first and second calibration sheets to assist a user in said positioning step.

8. The method of claim 1, comprising the further step of: calculating a rotational mis-calibration of the output device according to said offset.

9. An apparatus for providing automatic margin alignment using a digital document processor, comprising:
means for providing data to an output device to cause the output device to print a first calibration sheet;
said first calibration sheet having at least a first margin mark indicating a first margin location, a first edge, and a first edge region located between said first margin mark and said first edge;
a second calibration sheet having a first region that contrasts with said first edge region; wherein:
said first calibration sheet is adapted to be positioned relative to said second calibration sheet for scanning such that at least a portion of the first region adjoins said first edge; and
said scanning is adapted to detect locations of said first edge and said first margin mark; and
means for calculating an offset of said first margin mark relative to said first edge according to the detected locations of said first edge and said first margin mark.

10. The apparatus of claim 9, wherein:
said scanning is adapted to proceed along said portion toward said first edge, through said first edge region, and up to said first margin mark to detect said locations of said first edge and said first margin mark.

11. The apparatus of claim 9, further comprising:
means for providing the calculated offset to the digital document processor to calibrate data provided to the output device.

12. The apparatus of claim 11, wherein:
the calibration occurs during rasterization of the data.

13. The apparatus of claim 9, wherein:
said first calibration sheet further has a second margin mark indicating a second margin location, a second edge, and a second edge region located between said second margin mark and said second edge; and
said second calibration sheet has a second region that contrasts with said second edge region;
said first calibration sheet is adapted to be positioned relative to said second calibration sheet for scanning such that at least a portion of the second region adjoins said second edge; and
said scanning is adapted to proceed along said second region toward said second edge, through said second edge region, and up to said second margin mark to detect locations of said second edge and said second margin mark;
further comprising:
means for calculating an offset of said second margin mark relative to said second edge according to the detected locations of said second edge and said second margin mark.

14. The apparatus of claim 13, wherein:
said first margin mark indicates a margin of said first calibration sheet that is perpendicular to a margin indicated by said second margin mark.

15. The apparatus of claim 9, further comprising:
means for counting a number of scanning pixels between said first margin mark and said first edge; wherein:
said calculating means calculates said offset according to the number of scanning pixels and a scanning pixel resolution.

16. The apparatus of claim 9, wherein:
said first and second calibration sheets have corresponding alignment marks to assist a user in positioning said first calibration sheet relative to said second calibration sheet for scanning.

17. The apparatus of claim 9, further comprising:
means for calculating a rotational mis-calibration of the output device according to said offset.

18. First and second calibration sheets for use in providing automatic margin alignment in a digital document processor, wherein:
said first calibration sheet comprises:
at least a first margin mark indicating a first margin location, a first edge, and a first edge region located between said first margin mark and said first edge; and
said second calibration sheet comprising:
a first region that contrasts with said first edge region; wherein:
said first calibration sheet is adapted to be positioned relative to said second calibration sheet for scanning such that at least a portion of the first region adjoins said first edge;
locations of said first edge and said first margin mark are adapted to be detected by the scanning; and
the detected locations of said first edge and said first margin mark enable an offset of said first margin mark relative to said first edge to be calculated.

19. The calibration sheets of claim 18, wherein:
said first calibration sheet is printed on an output device; and
data provided to the output device for printing is calibrated according to said calculated offset during rasterization of the data.

20. The calibration sheets of claim 18, wherein:
said first calibration sheet further has a second margin mark indicating a second margin location, a second edge, and a second edge region located between said second margin mark and said second edge;
said second calibration sheet has a second region that contrasts with said second edge region;
said first calibration sheet is adapted to be positioned relative to said second calibration sheet for scanning such that at least a portion of the second region adjoins said second edge; and
the detected locations of said second edge and said second margin mark enable an offset of said second margin mark relative to said second edge to be calculated.

21. The calibration sheets of claim 20, wherein:
said first margin mark indicates a margin of said first calibration sheet that is perpendicular to a margin indicated by said second margin mark.

22. The calibration sheets of claim 18, wherein:
corresponding alignment marks are provided on said first and second calibration sheets to assist a user in positioning said first calibration sheet relative to said second calibration sheet for scanning.

23. The calibration sheets of claim 18, wherein:
the detected locations of said first edge and said first margin mark enable a rotational mis-alignment of the output device to be calculated.

* * * * *